United States Patent
Noronha et al.

(10) Patent No.: US 9,298,719 B2
(45) Date of Patent: Mar. 29, 2016

(54) ON-DEMAND CACHING IN A WAN SEPARATED DISTRIBUTED FILE SYSTEM OR CLUSTERED FILE SYSTEM CACHE

(75) Inventors: Ranjit M. Noronha, Mumbai (IN); Sandeep R. Patil, Pune (IN); Ajay K. Singh, Wakad (IN); Ravindra P. Walde, Pune (IN); Kailas S. Zadbuke, Pune (IN)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 13/602,883

(22) Filed: Sep. 4, 2012

(65) Prior Publication Data

US 2014/0067988 A1 Mar. 6, 2014

(51) Int. Cl.
*G06F 15/167* (2006.01)
*G06F 17/30* (2006.01)
*G06F 12/08* (2006.01)
*H04L 29/08* (2006.01)

(52) U.S. Cl.
CPC ...... *G06F 17/30132* (2013.01); *G06F 12/0813* (2013.01); *G06F 12/0888* (2013.01); *H04L 29/0881* (2013.01); *H04L 29/08729* (2013.01); *H04L 67/10* (2013.01); *H04L 67/28* (2013.01); *H04L 67/2847* (2013.01)

(58) Field of Classification Search
CPC ............ G06F 12/0813; G06F 12/0888; H04L 67/2847; H04L 67/842; H04L 67/10972; H04L 29/0881; H04L 29/08729
USPC ......................................................... 709/213
See application file for complete search history.

(56) References Cited

U.S. PATENT DOCUMENTS

| | | | |
|---|---|---|---|
| 7,418,494 B2 * | 8/2008 | Dahlin et al. | 709/224 |
| 7,584,294 B2 | 9/2009 | Plamondon | |
| 8,103,783 B2 | 1/2012 | Plamondon | |
| 2004/0255048 A1 * | 12/2004 | Lev Ran et al. | 709/249 |
| 2008/0228939 A1 * | 9/2008 | Samuels et al. | 709/235 |
| 2009/0287842 A1 | 11/2009 | Plamondon | |
| 2013/0086324 A1 * | 4/2013 | Soundararajan et al. | 711/122 |

\* cited by examiner

*Primary Examiner* — Blake Rubin
(74) *Attorney, Agent, or Firm* — Stephen R. Tkacs; Stephen J. Walder, Jr.; Rondall J. Bluestone (57) ABSTRACT

A mechanism is provided in a data processing system for on-demand caching in a wide area network (WAN) separated distributed file system or clustered file system. The mechanism monitors file access by a plurality of cache sites in the WAN separated distributed file system or clustered file system. The mechanism identifies access patterns by cache sites. The mechanism shares the access patterns with the plurality of cache sites. A given cache site within the plurality of cache sites combines the access patterns with local access information and identifies files to pre-fetch based on the combined information.

22 Claims, 5 Drawing Sheets

ON-DEMAND CACHING IN A WAN SEPARATED DISTRIBUTED FILE SYSTEM OR CLUSTERED FILE SYSTEM CACHE

BACKGROUND

The present application relates generally to an improved data processing apparatus and method and more specifically to mechanisms for on-demand caching in a Wide Area Network (WAN) separated distributed file system or clustered file system cache.

Architectures exist for achieving wide area network (WAN) caching. A home site may be a general parallel file system (GPFS) or any other file system that is network file system (NFS) exported. Multiple cache sites connect to the home site over the network. Multiple cache sites can NFS mount the home NFS exports. Only one cache site is permitted to write to the files in the cache for a particular NFS export. The other sites are read-only cache sites and can see updates from the home site and pull the updates in to the cache site. However, cache sites cannot send any writes or updates to files and directories to the home site. Multiple cache sites may be the single writer for different NFS exports from the home site.

SUMMARY

In one illustrative embodiment, a method, in a data processing system, is provided for on-demand caching in a separated distributed file system or clustered file system. The method comprises monitoring file access by a plurality of cache sites in the parallel file system. The method further comprises identifying access patterns by cache sites. The method further comprises sharing the access patterns with the plurality of cache sites. A given cache site within the plurality of cache sites combines the access patterns with local access information and identifies files to schedule pre-fetch based on the combined information.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for on-demand caching in a WAN separated Distributed File System or clustered file system. The mechanism categorizes files that have been used actively during a time window or have multiple users over a period of time as active files. The time window or the period of time may be fixed or variable depending on the granularity desired. The mechanism may use multiple time windows in which the same file or a number of different files may become active.

The home site may be at a central location. The home site is aware of which files are active as it general sees most of the writes and uncached reads. The home site is also in a position to perform certain statistical analysis. For example, over a period of several days, weeks, or months the home is in a position to determine which files start to become active, peak, and then become quiescent at which point in time. The home site collates this information and feeds it to the cache sites so they can perform targeted pre-population/pre-fetching of the files. Based on the information provided, the cache sites can reduce revalidation intervals for particular files. For a particularly active file, the home site may send a callback to the cache site when a write comes in.

Figure 1:
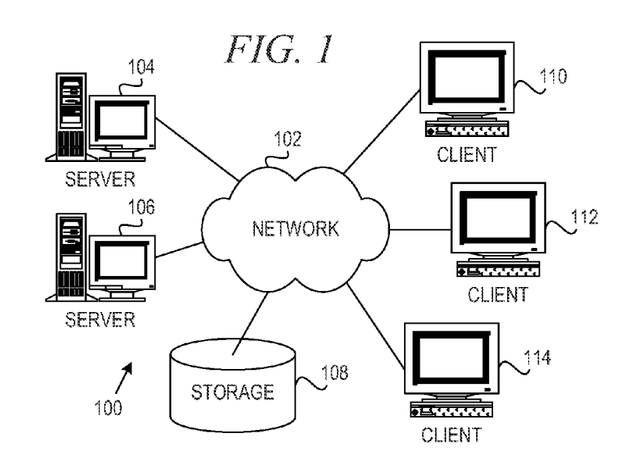
FIG. 1 depicts a pictorial representation of an example distributed data processing system in which aspects of the illustrative embodiments may be implemented.
Figure 2:
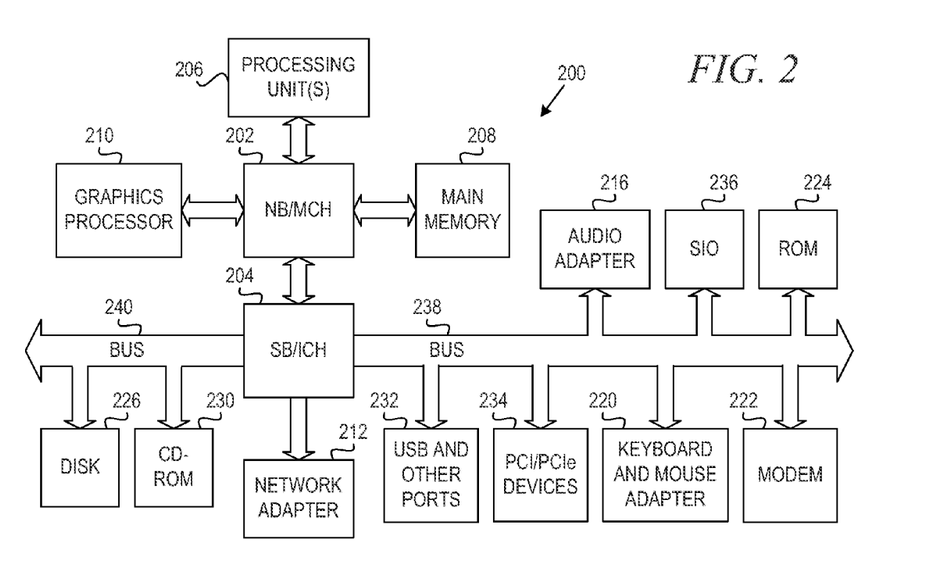
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System P® computer system, running the Advanced Interactive Executive operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated, data, for example. Essentially, data processing system 200 may be any known or later developed data processing system without architectural limitation.

Figure 3:
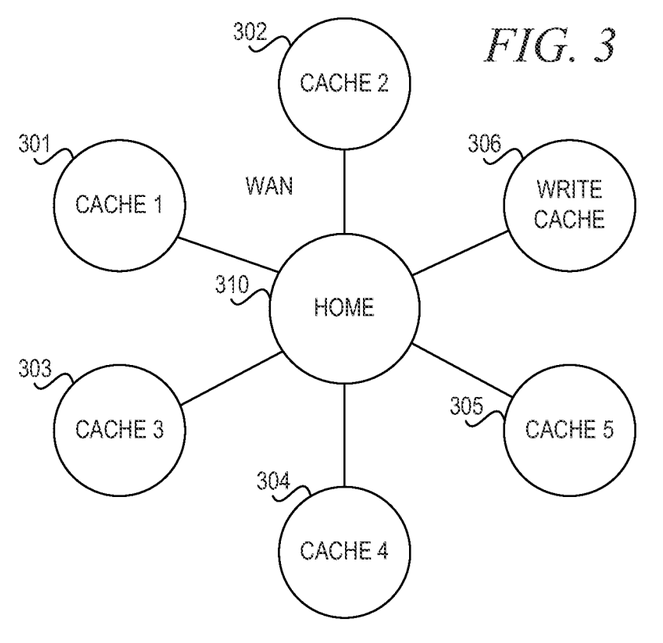
FIG. 3 depicts an example WAN separated Distributed File System or clustered file system in which aspects of the illustrative embodiments may be implemented.

Returning to FIG. 1, distributed data processing system 100 may employ a general parallel file system (GPFS) in which one node, such as server 104 is a home site, and other nodes, such as clients 110, 112, 114 and server 106, may be cache sites. FIG. 3 depicts an example WAN separated Distributed File System or clustered file system in which aspects of the illustrative embodiments may be implemented. Home site 310 connects to cache sites 301-306. Cache sites 301-305 are read-only sites for one or more file mounts, and cache site 306 is a write cache for the file mount.

The WAN separated distributed file system or clustered file system cache is based on the concept of on-demand caching. When a file is accessed, there are three different scenarios that are possible:
1. The file has been fetched recently, In this model, there is an access to a particular file. If the file already exists at the cache site and the file was stored at the cache site within a predetermined interval called the revalidation interval, then the file may be accessed directly in the cache, making it a local access, which is very fast.
2. The file has not been fetched recently. If the file exists at the cache site but the revalidation interval has expired since the file was stored at the cache site, the cache site performs a revalidation process against the home site copy. The cache site then performs a lookup to the home site to obtain modified time and change time attributes, if the modified time and change time of the file at the home site differ from the values of the file at the cache site, then the file is re-fetched from the home site to the cache site.
3. The file does not exist at the cache site. If the file does not exist at the cache site, the cache site fetches the file from the home site.

Certainly, in the latter two cases, the application experiences an access latency that is directly proportional to the file size and the bandwidth of the link to the home site.

A WAN separated Distributed File System or clustered file system with on-demand caching may experience two cases: cold access to a file and stale access. Stale access is when the cache site determines that the file is modified at the home site and must be re-fetched. The time for first access or stale access to a file within certain constraints is directly proportional to the file size and bandwidth of the link. This may be a significant overhead in the case of a slow or limited bandwidth link. Pre-population may alleviate the first access problem to some extent; however, when a file is not accessed for a long time, the file must be re-fetched from the home site, again introducing a delay.

Some solutions may be based on pre-population and file-based pre-fetching. Here pre-population means fetching the whole file from the home site to the cache site prior to it being needed. Pre-population will re-fetch the entire file in the cache if it is stale with respect to the home version. Pre-fetching means fetching portions of the file from the home before they are needed. Pre-fetching includes re-fetching, i.e. updating stale portions of a file from the home when the cache portions of these files are not in sync with the home portions of these files. Pre-population may help alleviate the cost of first access; however, it typically is executed by an administrator and is not an automated method of reducing first access time. It also cannot adapt dynamically to changes in access patterns, unless the administrator modifies the pre-population scheme. Generally, pre-population is a one-time action to bring in data to an empty cache. File data pre-fetching does not solve the problem of the time lag/delay on first access, or subsequent state access. Rather, it solves the problem of having the data for other parts of the file before they are needed after first access.

The mechanisms of the illustrative embodiments use the concept of active files, which may be categorized as those files that have either been used actively during a time window or have multiple users over a period of time. The time window or the period of time may be fixed or variable depending on a desired granularity. Alternatively, the mechanisms may use multiple time windows in which the same file or a number of different files may become active.

In a WAN separated Distributed File System or clustered file system with on-demand caching, the home site generally is at a central location. The home site is aware of which files are active as it generally sees most of the file writes and uncached reads. The home site also is in a position to perform certain statistical analysis. For example, over a period of several days, weeks, or months, the home site is in a position to determine which files start becoming active, peak, and then become quiescent, at which points in time. The home site can collate this information and feed it to the cache sites, so they can perform targeted pre-population/pre-fetching of the files when needed. Based on the information provided, the cache site can also reduce its revalidation interval for a particular file. For a particularly active file, the home site can send a callback to the cache site whenever a write comes in.

The home site determines the "heat" of a file or set of files. The home site then provides that information to the cache sites. For very active files, the home site may provide a callback to the cache site.

Figure 4:
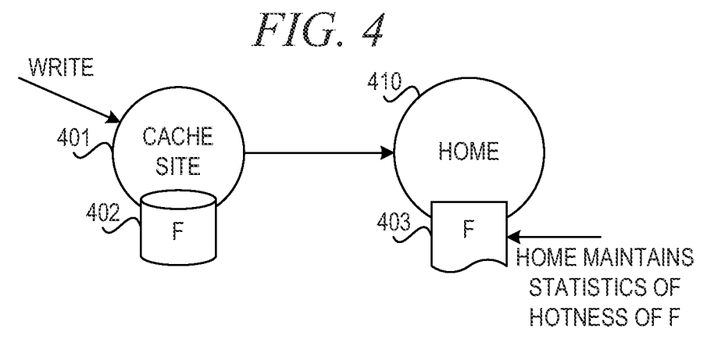
FIG. 4 depicts a home site determining file activity in accordance with an illustrative embodiment.

FIG. 4 depicts a home site determining file activity in accordance with an illustrative embodiment. Cache site 401 receives a write for file F 402. Home site 410 maintains statistics 403 of the hotness of F. The hotness of a file or set of files may be based on writes coming to the file and also on the reads from different cache sites and also having multiple users over a period of time. Also, different files may be active during different periods. Home site 410 stores and collates this information so as to determine access patterns.

Home site 410 may be the target of several different single-writer cache sites. Home site 410 can correlate information across mount points or directories. For example, a first file in a first mount point directory may be written to at the same time that a second file in a second mount point directory is written to. Also, it is important to determine sharing patterns of files. For example, a write to a file may be followed by a read from a set of files and then followed by a write from another node. The information about the sharing patterns may be continuously evolving. The history of the access patterns must be stored. For example, a particular file may be heavily accessed and modified between 2:00 PM and 3:00 PM on Wednesday. Information like this is valuable and may be used to great advantage by the cache sites.

Figure 5:
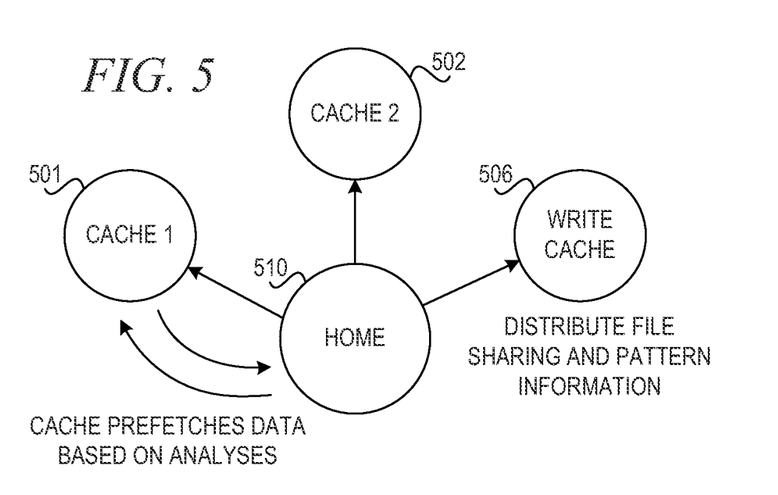
FIG. 5 depicts sharing analytics and statistics and pre-fetching based on the information in a WAN separated Distributed File System or clustered the system with on-demand caching in accordance with an illustrative embodiment.

FIG. 5 depicts sharing analytics and statistics and pre-fetching based on the information in a WAN separated Distributed File System or clustered file system with on-demand caching in accordance with an illustrative embodiment. Periodically, the home site 510 shares the access patterns and activeness with the different cache sites 501, 502, 506. The cache sites 501, 502, 506 combine the pattern information coming from home site 510 with the information they possess locally about the access patterns of the clients to which they are connected. The cache sites 501, 502, 506 then attempt to pre-fetch or schedule pre-fetching the files that are most likely to be accessed.

On occasion, there may be a file that may be very active and being heavily accessed. This information may not have been made available to the other cache sites because it is a recent pattern. In accordance with an example embodiment, a provision may be made to install a look that will callback or callout to the cache site to inform the cache site that it may need to pre-fetch the data to the cache to offset the on-demand penalty of the file.

Statistical analysis involves weighing data on heuristically patterns spread across different cache site to help schedule predictive prefetching of tiles. One example: If User A accesses a Data X for a given event from a given cache site; and through statistical analysis based on heuristics it suggests that Data Y be accessed by the user from the same cache in a predetermined interval of time—then nominating/predicting Data Y for pre-fetch (stating it very active for next predetermined interval of time) for that particular cache during that particular event and time helps make caching more effective.

Here is one such example for the embodiment to help describe its implementation.

For algorithm A, consider the following nomenclature:

$R(x,t,c)$—Read to a particular data element x at time t, where t is the time at a central site designated as the home site and c is a cache cluster ID, $W(x,t,c)$—Write to a particular data element x at time t, where t is the time at a central site designated as the home site and c is a cache cluster ID.

$T(t,x)$—T is a two dimensional table indexed along the x-axis by time running from 0-interval P (where P is a predetermined value, e.g., 24 hours) and a granularity G (e.g., 1 second). Each element in T is a linked list of $R(x,t,c)$ and $W(x,t,c)$ elements. These elements are in no particular order.

$T'(t,x)$—T' is a two dimensional table similar in structure to T. The difference between T and T' is that each element in T' is a bunch of linked list of $R(x,t,c)$ and $W(x,t,c)$ elements (one linked list for each data element x), where each list is sorted on time of arrival t.

$T''(t,x)$—T" is similar to T' with the addition of linkages between graph elements. T" is persistent and helps build the heuristics and evolution.

M—Consolidation time interval.
D—Consolidation interval granularity.
G—Time Interval Granularity.
P—Particular Recurring Interval in Granularity G.

The algorithm proceeds as follows:

Step S: At every time interval M, do the following steps at the central site:
  a. Transform T to a new table T' with granularity D, by combining D/G adjacent elements along the x-axis such that we have lists of read/write sequences to the same data element x in sequential time.
  b. Further transform T' to T" such that:
    i. If any particular element in the graph 17 with data element x has only reads, create a link (if it exists) to the preceding write to x.
    ii. if any particular table entry with data entry x only has writes, create a link to the next set of reads (could be in another grid element).

Algorithm A is merely an implementation detail and is not meant to limit the illustrative embodiments. A person skilled in the art can easily replace Step S with other known statistical algorithms like Statistical Inference, Markov etc.

In the general I/O path at the central site/home:
For an incoming $W(x,t,c)$:
  i. Update existing table T with information of Write in appropriate grid entry, depending on time interval in which it lies.
  ii. Using table T", determine subsequent predicted Reads from other cache clusters to the data element x (if they exist). If a subsequent Read exists, push Read to that cache cluster site.
For in incoming $Read(x,t,c)$:
  i. Update existing table T with information of Read in appropriate grid entry, depending on time interval in which it ties.

Algorithm B: The central site or home site shares the contents of Table T" with the cache sites. The cache sites determine, based on their access patterns, which data elements they want to pull in.

Algorithm C: For very active files whose access pattern is not represented in T", the central site or home site sends a callback to the cache sites. The cache sites then decide if they want to pull in the file.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
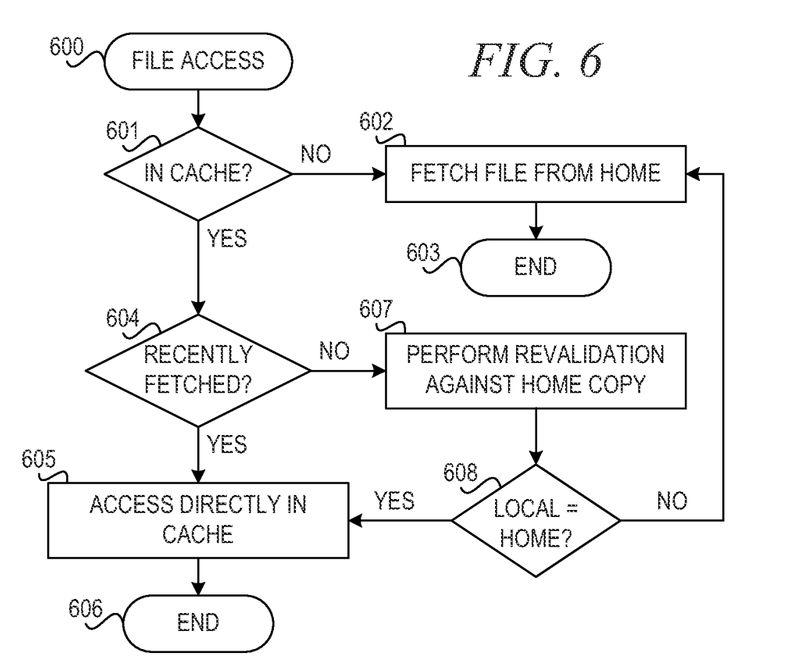
FIG. 6 is a flowchart illustrating operation of a cache site with on-demand caching in a WAN separated Distributed File System or clustered file system in accordance with an illustrative embodiment.

FIG. 6 is a flowchart illustrating operation of a cache site with on-demand caching in a WAN separated Distributed File System or clustered file system in accordance with an illustrative embodiment. Operation begins when the cache site experiences a file access by a client (block 600). The cache site determines whether the file is in its local cache (block 601). If the file is not in the local cache, the cache site fetches the file from the home site (block 602), and operation ends (block 603).

If the cache site determines the file is in local cache in block 601, the cache site determines whether the file is recently fetched (block 604). The cache site determines whether the file was fetched within a predetermined time threshold. If the file is recently fetched, the cache site accesses the file directly in the local cache (block 605), and operation ends.

If the cache site determines the file is not recently fetched in block 604, the cache site performs revalidation against the home copy (block 607). To perform revalidation, the cache site obtains the modified time and change time attributes of the file from the home site and compares them to the same attributes of the copy of the file in the local cache. The cache site determines whether the time attributes of the local file match the time attributes of the file at the home site (block 608). If the attributes do not match, the cache site fetches the file from the home site (block 602), and operation ends. If the attributes match in block 608, the cache site access the file directly in the local cache (block 605), and operation ends (Block 606).

Figure 7:
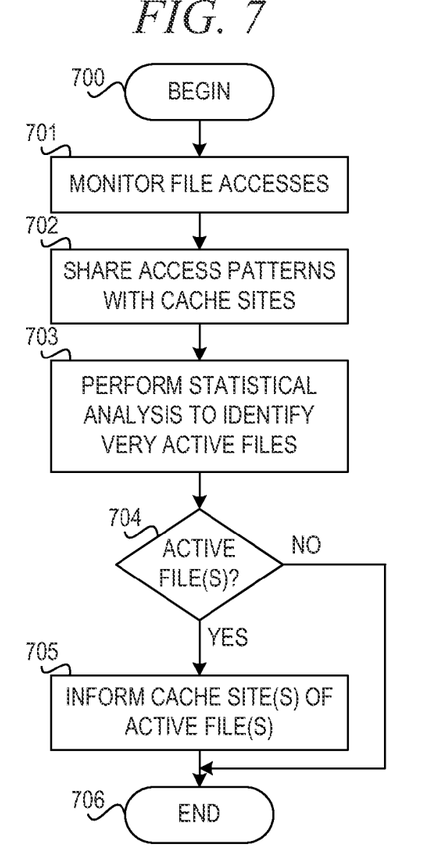
FIG. 7 is a flowchart illustrating operation of a home site for on-demand caching in a WAN separated Distributed File System or clustered file system in accordance with an illustrative embodiment.

FIG. 7 is a flowchart illustrating operation of a home site for on-demand caching in a WAN separated Distributed File System or clustered file system in accordance with an illustrative embodiment. Operation begins (block 700). The home site monitors file accesses (block 701) and shares access patterns with cache sites (block 702). The access patterns may be shared as table T".

The home site performs analysis to identify very active files (block 703). This analysis may identify files that have been used actively during a predetermined time window and/or files that have multiple users over a period of time. The time window and period of time may be fixed or variable depending on the granularity desired. The home site may perform statistical analysis block 703 based on table T", as described above. The home site then determines whether one or more active files are identified (block 704). If active files are identified, the home site informs the cache site(s) of the identified active file(s) (block 705), and operation ends (block 706). If the home site does not detect active files in block 704, then operation ends. The home site may repeat the operation of FIG. 7 periodically to continuously provide information for pre-fetch scheduling to the cache sites.

Figure 8:
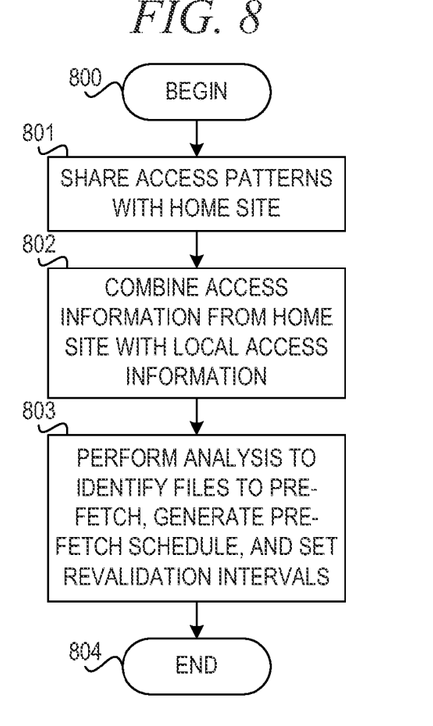
FIG. 8 is a flowchart illustrating operation of a cache site scheduling pre-fetching in accordance with an illustrative embodiment.

FIG. 8 is a flowchart illustrating operation of a cache site scheduling pre-fetching in accordance with an illustrative embodiment. Operation begins (block 800), and the cache site shares access patterns with the home site (block 801). In block 801, the cache site may receive table T", which identifies reads and writes for a predetermined period of time, P. The cache site combines access information from the home site with local access information (block 802). The cache site then performs analysis to identify files to pre-fetch, generate pre-fetch schedule, and set revalidation intervals (block 803). Thereafter, operation ends (block 804).

Figure 9:
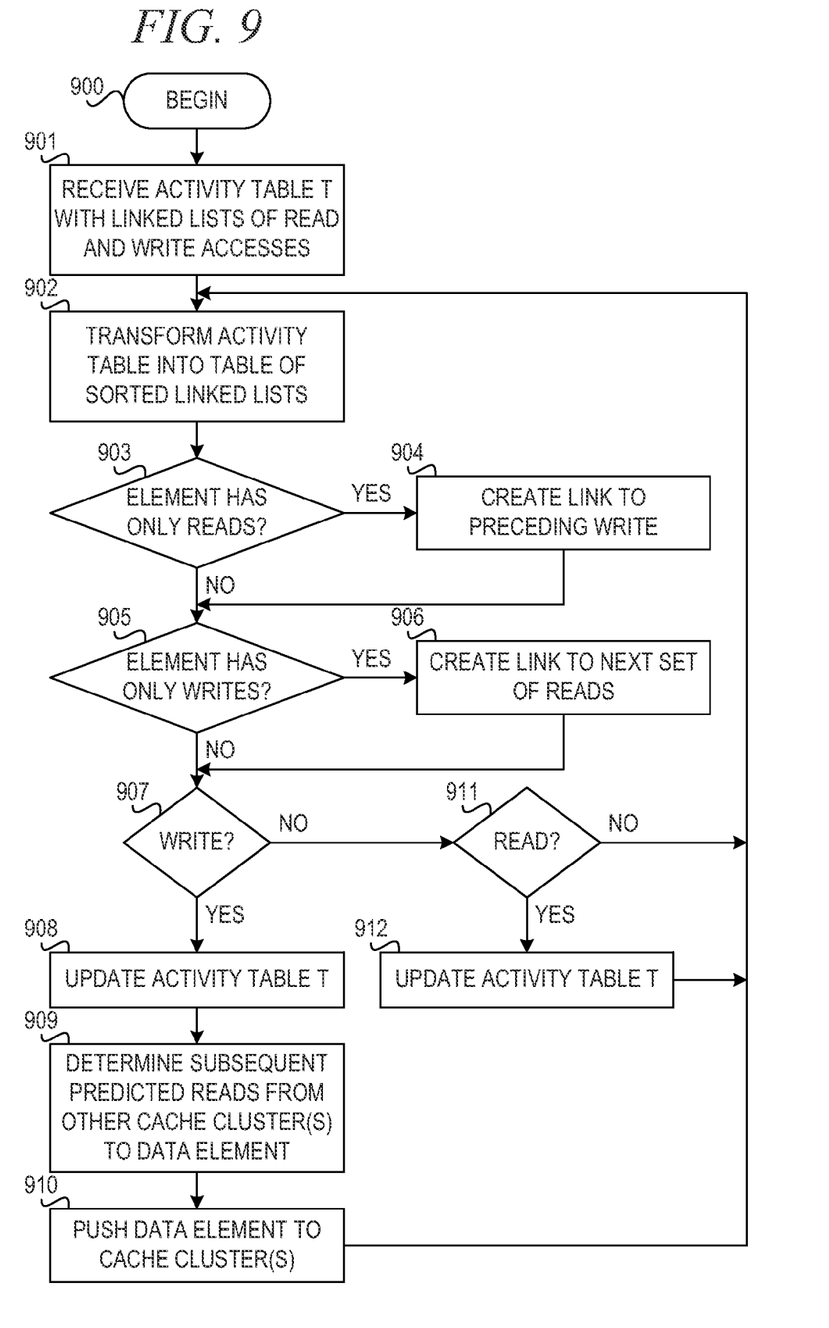
FIG. 9 is a flowchart illustrating operation of a cache site performing statistical analysis of access information in accordance with an illustrative embodiment.

FIG. 9 is a flowchart illustrating operation of a cache site performing statistical analysis of access information in accordance with an illustrative embodiment. Operation begins (block 900), and the home site receives an activity table, T, with linked lists of read access and linked lists of write accesses (block 901), T(t,x) is a two dimensional table indexed along the x-axis by time running from 0-interval P (where P is a predetermined value, e.g., 24 hours) and a granularity G (e.g., 1 second). Each element in T is a linked list of R(x,t,c) and W(x,t,c) elements. These elements are in no particular order. The home site then transforms the activity table, T, into a table of sorted linked lists, T' (block 902). T'(t,x) is a two dimensional table similar in structure to T. The difference between T and T' is that each element in T' is a bunch of linked list of R(x,t,c) and W(x,t,c) elements (one linked list for each data element x), where each list is sorted on time of arrival t.

The home site then determines whether any element in T' has only reads (block 903). If an element has only reads, the home site creates a link to the preceding write (block 904). Thereafter, or if no element in T has only reads in block 903, the home site determines whether any element in T' has only writes (block 905). If an element has only writes, the home site creates a link to the next set of reads (block 906). The operation of blocks 903-906 result in an updated activity table, T". T"(t,x) is similar to T' with the addition of linkages between graph elements. T" is persistent and helps build the heuristics and evolution.

Thereafter, or if no element in has only writes in block 905, the home site determines whether an incoming write is encountered (block 907). If a write is encountered for a data element at the home site, the home site updates the activity table, T (block 908). The home site then uses T" to determine subsequent predicted reads from one or more other cache clusters to the data element (block 909). The home site pushes the data element to the one or more cache clusters (block 910). Thereafter, operation returns to block 902 to transform the activity table into a table of sorted linked lists.

If the home site does not encounter a write in block 907, the home site determines whether an incoming read is encountered (block 911). If a read is encountered for a data element at the home site, the home site updates the activity table, T (block 912). Thereafter, or if the home site does not encounter a read in block 911, operation returns to block 902 to transform the activity table into a table of sorted linked lists.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the Hock may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for on-demand caching in a WAN separated Distributed File System or clustered file system. The mechanism reduces the penalty of first access. The expected reduction will depend on the accuracy of the prediction logic. The reduction will also depend on the periodicity of the sharing information between the cache sites and the home site. For at least some of the first or cold accesses, time will be equivalent to local access. The mechanisms may also be used for network attached storage solutions, such as network file systems.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device causes the computing device to:
    monitor, by a home site in a separated distributed file system or clustered file system, file access by a plurality of cache sites in the separated distributed file system or clustered file system;
    record, by the home site, file accesses in an activity table, wherein the activity table is a two-dimensional table indexed by time over a predetermined interval P and a granularity G, wherein each element in the activity table is a linked list of read and write elements;
    transform the activity table into a sorted activity table wherein each element in the sorted activity table is a linked list of read and write elements sorted by time;
    convert the sorted activity table into a converted activity table by creating a link to a preceding write for each element in the stored activity table having only reads and creating a link to a next set of reads for each element in the sorted activity table having only writes;
    identify, by the home site and based on the converted activity table, access patterns by cache sites; and
    share the access patterns with the plurality of cache sites, wherein a given cache site within the plurality of cache sites combines the access patterns with local access information and identifies files to pre-fetch based on the combined information.

2. The computer program product of claim 1, wherein the home site maintains statistics of file access patterns with respect to files in the separated distributed file system or clustered file system.

3. The computer program product of claim 2, wherein the computer readable program further causes the computing device to:
    performing analysis to identify at least one active file; and
    responsive to identifying at least one active file, informing at least one cache site within the plurality of cache sites of the at least one active file, wherein the at least one cache site pre-fetches the at least one active file.

4. The computer program product of claim 1, wherein the given cache site performs analysis to identify files to pre-fetch.

5. The computer program product of claim 1, wherein the given cache site performs analysis to generate a pre-fetch schedule.

6. The computer program product of claim 1, wherein the given cache site resets at least one revalidation interval.

7. The computer program product of claim 1, wherein sharing the access patterns comprises sending the converted activity table to the plurality of cache sites.

8. The computer program product of claim 1, wherein the computer readable program further causes the computing device to:
responsive to receiving a write for a data element at the home site, determine subsequent predicted reads from at least one cache site based on the converted activity table; and
push the data dement to the at least one cache site.

9. The computer program product of claim 8, wherein determining subsequent predicted reads comprises weighing data on heuristic patterns across different cache site to schedule predictive prefetching of files.

10. The computer program product of claim 9, wherein determining subsequent predicted reads further comprises:
responsive to a given user accessing a first data element from a given cache site, identifying a second data element that is likely to be accessed by the given user from the given cache site in a predetermined interval of time and nominating the second data element for pre-fetching.

11. The computer program product of claim 1, wherein the computer readable program is stored in a computer readable storage medium in a data processing system and wherein the computer readable program was downloaded over a network from a remote data processing system.

12. The computer program product of claim 1, wherein the computer readable program is stored in a computer readable storage medium in a server data processing system and wherein the computer readable program is downloaded over a network to a remote data processing system for use in a computer readable storage medium with the remote system.

13. A method, in a data processing system, for on-demand caching in a separated distributed file system or clustered file system, the method comprises:
Monitoring file access by a plurality of cache sites in the separated distributed file system or clustered file system;
recording file accesses in an activity table, wherein the activity table is a two-dimensional table indexed by time over a predetermined interval P and a granularity G, wherein each element in the activity table is a linked list of read and write elements;
transforming the activity table into a sorted activity table wherein each element in the sorted activity table is a linked list of read and write elements sorted by time;
convert the sorted activity table into a converted activity table by creating a link to a preceding write for each element in the stored activity table having only reads and creating a link to a next set of reads for each element in the sorted activity table having only writes;
identifying, based on the converted activity table, access patterns by cache sites; and
sharing the access patterns with the plurality of cache sites, wherein a given cache site within the plurality of cache sites combines the access patterns with local access information and identifies files to pre-fetch based on the combined information.

14. The method of claim 13, wherein the home site maintains statistics of file access patterns with respect to files in the separated distributed file system or clustered file system.

15. The method of claim 14, further comprising:
performing analysis to identify at least one active file; and
responsive to identifying at least one active file, informing at least one cache site within the plurality of cache sites of the at least one active file, wherein the at least one cache site pre-fetches the at least one active file.

16. The method of claim 13, wherein the given cache site performs analysis to identify files to pre-fetch and generate a pre-fetch schedule.

17. The method of claim 13, wherein the given cache site to reset at least one revalidation interval.

18. The method of claim 13, wherein sharing the access patterns comprises sending the converted activity table to the plurality of cache sites.

19. The method of claim 13, further comprises:
responsive to receiving a write for a data element at the home site, determine subsequent predicted reads from at least one cache site based on the converted activity table; and
push the data dement to the at least one cache site.

20. An apparatus, comprising:
a processor, and
a memory coupled to the processor, wherein the memory comprises instructions which, when executed by the processor, cause the processor to:
monitor file access by a plurality of cache sites in the separated distributed file system or clustered file system;
record file accesses in an activity table, wherein the activity table is a two-dimensional table indexed by time over a predetermined interval P and a granularity G, wherein each element in the activity table is a linked list of read and write elements;
transform the activity table into a sorted activity table wherein each element in the sorted activity table is a linked list of read and write elements sorted by time;
convert the sorted activity table into a converted activity table by creating a link to a preceding write for each element in the stored activity table having only reads and creating a link to a next set of reads for each element in the sorted activity table having only writes;
identify, based on the converted activity table, access patterns by cache sites; and
share the access patterns with the plurality of cache sites, wherein a given cache site within the plurality of cache sites combines the access patterns with local access information and identifies files to pre-fetch based on the combined information.

21. The apparatus of claim 20, wherein the home site maintains statistics of file access patterns with respect to files in the separated distributed file system or clustered file system, wherein instructions further cause the processor to:
perform analysis to identify at least one active file; and
responsive to identifying at least one active file, inform at least one cache site within the plurality of cache sites of the at least one active file, wherein the at least one cache site pre-fetches the at least one active file.

22. The computer program product of claim 20, wherein the computer readable program further causes the computing device to:
responsive to receiving a write for a data element at the home site, determine subsequent predicted reads from at least one cache site based on the converted activity table; and
push the data dement to the at least one cache site.

* * * * *